US012618443B2

(12) United States Patent
Shahin

(10) Patent No.: US 12,618,443 B2
(45) Date of Patent: May 5, 2026

(54) CALIPER HOUSING FOR A DISK BRAKE SYSTEM AND METHOD FOR MANUFACTURING A CALIPER HOUSING

(71) Applicant: HL MANDO CORPORATION, Pyeongtaek-si (KR)

(72) Inventor: Hatem Shahin, Pfaffenhofen (DE)

(73) Assignee: HL MANDO CORPORATION, Pyeongtaek si (KR)

( * ) Notice: Subject to any disclaimer, the term of this patent is extended or adjusted under 35 U.S.C. 154(b) by 404 days.

(21) Appl. No.: 18/138,899

(22) Filed: Apr. 25, 2023

(65) Prior Publication Data

US 2023/0341017 A1 Oct. 26, 2023

(30) Foreign Application Priority Data

Apr. 25, 2022 (DE) .......................... 102022203988.2

(51) Int. Cl.
F16D 65/00 (2006.01)
(52) U.S. Cl.
CPC ................................ F16D 65/0081 (2013.01)
(58) Field of Classification Search
CPC ............. F16D 2250/00; F16D 65/0081; F16D 65/0068; F16D 65/0006; F16D 65/0075; F16D 65/14; F16D 2121/04; F16D 2125/02; F16D 2055/0016; B33Y 10/00
See application file for complete search history.

(56) References Cited

U.S. PATENT DOCUMENTS

| | | | | |
|---|---|---|---|---|
| 5,887,684 A | * | 3/1999 | Doll | F16D 65/18 |
| | | | | 92/170.1 |
| 6,719,104 B1 | | 4/2004 | Wemple et al. | |
| 9,989,112 B1 | * | 6/2018 | Lethorn | F16D 65/0068 |

FOREIGN PATENT DOCUMENTS

| | | | |
|---|---|---|---|
| DE | 102016212878 A1 | 1/2018 | |
| DE | 102016212880 A1 | 1/2018 | |
| DE | 102017125261 A1 | 5/2018 | |
| DE | 102020204498 A1 | 10/2021 | |
| KR | 10-2007-0036282 A | 4/2007 | |
| KR | 10-2009-0077181 A | 7/2019 | |
| WO | 2017-108793 A1 | 6/2017 | |

OTHER PUBLICATIONS

European Patent No. EP 1058020 to Haesler et al. published on Oct. 4, 2006.*
Text Translation of German Patent No. DE 102016212878 obtained from PE2E on Jul. 22, 2025.*

(Continued)

*Primary Examiner* — Pamela Rodriguez
(74) *Attorney, Agent, or Firm* — LEE, HONG, DEGERMAN, KANG & WAIMEY

(57) ABSTRACT

The application relates to a caliper housing for a disk brake system. In addition, the application relates to a method for manufacturing a caliper housing. The proposed caliper housing comprises an inner part, an outer part, and a bridge part. The bridge part connects the inner part and the outer part. The caliper housing is formed by additive manufacturing such that a first region of the caliper housing and a second region of the caliper housing are formed and such that the first region has different material properties than the second region.

12 Claims, 16 Drawing Sheets

(56) References Cited

OTHER PUBLICATIONS

Text Translation of German Patent No. DE 102016212880 obtained from PE2E on Jul. 22, 2025.*
Text Translation of WO document No. WO 2017/108793 obtained from PE2E on Jul. 22, 2025.*
Office Action issued in corresponding German Patent Application No. 10 2022 203 988.2 dated Dec. 6, 2022.
Werkstoffwahl Fur Technische Anwendungen.

* cited by examiner

4

20

CALIPER HOUSING FOR A DISK BRAKE SYSTEM AND METHOD FOR MANUFACTURING A CALIPER HOUSING

CROSS-REFERENCE TO RELATED APPLICATION

This application is based on and claims priority under 35 U.S.C. § 119 to German Patent Application No. 102022203988.2, filed on Apr. 25, 2022 in the German Patent and Trade Mark Office, the disclosures of which are incorporated herein by reference.

TECHNICAL FIELD

The application relates to a caliper housing for a disk brake system. In addition, the application relates to a method for manufacturing a caliper housing.

BACKGROUND

Brake calipers are typically used in disk brake systems of vehicles to support and carry two brake pads that are movable relative to a brake disk of the disk brake system upon brake application. Typical disk brake systems further comprise a caliper housing having an inner part, which receives a brake piston. The brake piston may be configured to push against a back side of one of the brake pads. The caliper housing may further comprise an outer part that is a caliper finger configured to push against a back side of the other one of the brake pads. In a generally known manner, the brake pads can thus clamp the braked member in between them to stop or slow down the vehicle. The inner part and the outer part are typically connected via a bridge part of the caliper housing. The caliper housing is typically formed by a metal part made by casting using cast iron. The inner and outer parts of the caliper housing may lie on opposite sides of the brake disk and may be spaced apart from one another along an axial direction, the axial direction corresponding to an axis of rotation of the brake disk. A prior art example of a brake caliper can be found in document KR20090077181A.

During brake activation, relatively large forces may act on the caliper housing. The caliper housing may thus deform. This can be accompanied by a number of disadvantages. For example, an uneven wear of the brake pads and specifically of their brake linings may occur. This may result in further problems, such as the generation of drag torque or noise. Furthermore, a hydraulic volume absorbed by the caliper housing and more specifically by a hydraulic chamber, i.e., a cavity, comprised by the caliper housing may increase as a result of said deformation. This additional brake fluid volume absorption is generally undesired for brake performance reasons and hence safety reasons.

When developing brake calipers, simulations and structural optimizations with the aid of computer implemented models of the caliper housing may be performed before the caliper housing is cast. So far, it requires a lot of experience and iterations until certain targets are met, e.g., with regard to elastic deformation. This approach is often inefficient as it does not always guarantee optimal outcomes. For example, the known methods may lead to non-optimal brake caliper designs with respect to other relevant parameters, such as weight and price.

SUMMARY

In view of the above-mentioned aspects, it is an object of the present application to provide an improved caliper housing for a disk brake system. In particular, it is an object of the application to provide a compact, robust, and lightweight caliper housing at a low cost, which does not lead to undesirable noise generation of the disk brake system. In addition, it is an object of the application to provide an improved method for manufacturing a caliper housing having these advantages.

This objective is achieved by a caliper housing for a disk brake system comprising the features of claim 1 and by a method having the steps according to another claim. Optional further features and further developments will become apparent from the dependent claims and the detailed description in conjunction with the accompanying figures.

The proposed caliper housing for a disk brake system comprises an inner part, an outer part, and a bridge part. The bridge part connects the inner part and the outer part. The caliper housing is formed by additive manufacturing such that a first region of the caliper housing and a second region of the caliper housing are formed and such that the first region has different material properties than the second region. In some examples, the different material properties may be at least one of a different E modulus, a different G modulus, a difference in Poisson's ratio, a different thermal expansion coefficient, a different specific heat, a different thermal conductivity and a different vibration loss factor. By providing the at least two different regions having different material properties, a compact, robust, and lightweight caliper housing may be fabricated at a comparatively low cost. The present invention takes into account that the requirements on the material properties are not the same in all regions of the caliper housing. E.g., the load, strain and stress exerted on the caliper housing is typically different in the different regions in realistic braking scenarios. As compared with known cast caliper housings, the proposed caliper housing enables enhanced design options and a particularly focused optimization of the properties of the caliper housing. Due to the targeted control of the material properties in the different regions, lengthy post-processing and finishing work such as grinding may not be necessary, as it is sometimes the case for cast caliper housings. The properties of the caliper housing may be improved by changing the material properties in the desired regions only, without unnecessarily changing the material properties of the entire structure, as it would be the case for known cast caliper housings. Therefore, the above-mentioned problems of known caliper housings may be overcome in a particularly simple and effective manner to improve performance, function and dynamic behaviour of the caliper housing.

In most embodiments, the outer part is a caliper finger. Further, in most embodiments, the inner part is configured to receive a brake piston. The inner part may comprise a cavity. The inner part may be configured to receive the brake piston within the cavity. The application may further relate to a disk brake system having a caliper housing as described above or below. The disk brake system may further comprise an axle assembly. Additionally or alternatively, the disk brake system may comprise one or two brake pads, a caliper bracket and/or a brake disk. The caliper bracket may be referred to as a mounting bracket and/or as a carrier. The brake pad may be configured to slide with respect to the caliper bracket in an axial direction upon brake application. The axial direction may be parallel to an axis of rotation of the brake disk. In most embodiments, the disk brake system is a floating caliper brake. However, in other embodiments, the disk brake system may be a fixed caliper brake. The disk brake system may comprise the brake piston. The brake pad may comprise a back plate having a front side for facing the brake disk and a friction layer arranged on the front side of the back plate for contacting a friction surface of the brake disk. The back plate may comprise a guiding protrucion configured to be slidably received within a guiding recess of the caliper bracket. The guiding protrusion may be an ear portion of the back plate. The guiding recess of the caliper bracket may be a guiding groove. The brake piston or caliper finger may be configured to push against a back side of the brake pad to push the friction layer of the brake pad against the friction surface of the brake disk upon actuation of the disk brake system, e.g., hydraulic or electric actuation.

The first and second regions of the caliper housing may be formed using different materials. For example, the first region may be formed using a first material and the second region may be formed using a second material. The first material may have different material properties than the second material. In some embodiments, at least one of mechanical, chemical and thermal properties of the first material may be different from that of the second material. The first and second regions may be metallic. For example, the first material may be a first metal and the second material may be a second metal. In some embodiments, the first and second materials differ in their alloy composition. In some embodiments, the first material and the second material may be the same. For example, the first and second regions may be formed using the same material. In some embodiments, the first and second regions are formed by the same metal. For example, the different material properties may result, at least in part, from different structural properties in the first and second regions. The first region, for example, may be formed by a sintered metal having first structural properties, and the second region may be formed by a sintered metal having second structural properties different from the first structural properties. In most embodiments, the first region has a different density than the second region. Thereby, the material properties (e.g., the E modulus, G modulus, and/or thermal properties) of the first and second regions may be effectively controlled.

The application further relates to a method for manufacturing a caliper housing as described above or below. The method comprises the step of forming the caliper housing by additive manufacturing such that the first region of the caliper housing and the second region of the caliper housing are formed. The first and second regions may be formed as different regions of a one-piece part. In particular, the inner part, the outer part, and the bridge part may be formed together as a single one-piece part. The caliper housing may in some embodiments comprise more regions having different material properties. For example, the caliper housing may comprise a third region having material properties different from those of the first and second regions.

The first region and the second region of the caliper housing may be formed using a known additive manufacturing technique, in particular a 3D printing technique. For example, the first and second regions may be formed by an additive metal manufacturing process. In some embodiments, the first region and the second region are formed by selective sintering, in particular selective laser sintering. Thereby, the desired material properties of the first and second regions may be efficiently controlled. Typically, the caliper housing is formed by selective laser sintering. For example, the density of the sintered metal may be controlled in the selective laser sintering process to achieve the desired E modulus, G modulus, and/or thermal properties in the first and second regions.

In some embodiments, the first region has a higher thermal conductivity and/or higher specific heat than the second region. For example, the first region may have a higher density, higher thermal conductivity and/or higher specific heat than the second region. Thereby, the thermodynamic properties of the caliper housing may be improved. The first region of the caliper housing may be a region of enhanced heat influx. The heat influx into the caliper housing may result from heat generation due to contact of the brake pad with the disk. Therefore, the first region may be a central portion of the bridge part. The first region may be a region that is located adjacent to and/or above the brake disk. Due to the higher thermal conductivity and/or higher specific heat in this region, heat may be more efficiently dissipated. Further, the heat influx into the caliper housing may result from heat generation of the compressed brake fluid in the cavity of the inner part. Therefore, the first region may additionally or alternatively be a portion of the inner part. The inner part may be configured to receive the brake piston. The first region may be arranged adjacent to the cavity of the inner part. The first region may be arranged underneath the cavity of the inner part.

In further embodiments, the first region may have a higher E modulus than the second region. Thereby, the elastic properties of the caliper housing may be chosen in a targeted manner to avoid constraint areas and bending moments in the caliper housing. In particular, a deformation of the housing may be prevented, thereby avoiding changes in fluid volume of the cavity, enabling parallel and homogeneous contact of the brake pads with brake disk, avoiding oblique wear of the brake pads, and improving drag torque. The elastic properties may be set such that energy is efficiently absorbed in the form of internal deformation. The first region may be chosen such that a deformation, in particular a concave curvature of the bridge part, during brake application is avoided. For example, the first region may be formed in the bridge part. In this way, concave curvature of the bridge part of the caliper housing may be reduced or avoided. Additionally or alternatively, the first region may be formed in a region of an interface between the inner part and the bridge part. Additionally or alternatively, the first region may be formed in a region of an interface between the outer part and the bridge part. In this way, deformation of the caliper housing may be avoided most efficiently to guarantee that the brake pads remain in a parallel orientation.

In further embodiments, the first region has a higher G modulus than the secand region. Thereby, structural stability may be improved in regions that are exposed to greater forces. For example, the first region may be formed in a portion of the outer part. The first region may be formed in a region of the outer part that is configured to push against a back side of the brake pad. Additionally or alternatively, the first region may be formed in a portion of the inner part, wherein the inner part is configured to receive the brake piston. The first region may be arranged adjacent the cavity, e.g. above and/or below the cavity. In this way, structural stability of the caliper housing may be improved most efficiently.

In further embodiments, the first region has a higher vibration loss factor than the second region. In this way, squeal noise may be efficiently reduced in the places where it is generated or transmitted. This may be achieved by improving the joint damping at interfaces. For example, the first region may form an interior surface of the outer part. The first region may be arranged in a region of the outer part that is configured to push against the back side of the brake pad. Thereby, squeal noises resulting vibrational modes at the interface of the caliper finger and the brake pad may be reduced. Additionally or alternatively, the first region may form an interior surface of the inner part configured for facing the brake piston. The first region may be formed in a surface of the inner part that forms the cavity. In this way, squeal noise resulting from the relative motion of the brake piston and the inner part may be dampened.

In some embodiments, the caliper housing is formed by additive manufacturing such that a hole region of the caliper housing is formed. The hole region may comprise at least one through hole. In this way, a more robust, variable and lightweight design of the caliper housing may be achieved. The hole region may be formed in the outer part or in the bridge part. In some embodiments having the hole region, it may be provided, but is not necessarily required, that the caliper housing is formed by additive manufacturing such that a first region of the caliper housing and a second region of the caliper housing are formed and such that the first region has different material properties than the second region. By providing the hole region in the outer part, an advantageous dynamic behaviour of the caliper housing can be achieved. As compared with the known double finger-shaped cast parts, providing the hole region in the outer part may create a more robust and stiffer finger side and may reduce the number of eigenfrequencies and bending modes of the caliper housing. Further, in embodiments in which the outer part comprises an interior surface that is configured to push against the back side of the brake pad, the hole region may be formed in the outer part. In this case, a pressure region of the outer part that is configured to push against the back side of the brake pad may be essentially circular. The pressure region may surround the through hole. Thereby, a shape of the pressure region of the outer part may correspond to a shape of a pressure region formed by a circular pressure region formed by the brake piston that is received within the inner part. In this way, structural stability may be improved due to a more symmetric pressure distribution, leading to improved stability and reduced noise generation, in particular reduced squeal noise generation that appears in frequencies between 1 and 12 KHz.

Features mentioned above or below with regard to the caliper housing or the disk brake system apply correspondingly to the method for manufacturing the caliper housing and vice versa. Also, it is noted that the disclosure relates to a caliper housing that has any or all of the features as described above or below. For example, the caliper housing may have a first region having a higher thermal conductivity and/or higher specific heat than the second region as described above, wherein the caliper housing may additionally or alternatively have a third region having a higher E modulus than a fourth region of the caliper housing as described above, wherein the caliper housing may additionally or alternatively have a fifth region having a higher G modulus than a sixth region of the caliper housing as described above, wherein the caliper housing may additionally or alternatively have a seventh region having a higher vibration loss factor than an eighth region of the caliper housing as described above.

BRIEF DESCRIPTION OF DRAWINGS

Exemplary embodiments will be described in conjunction with the following figures.

DETAILED DESCRIPTION

Figure 1:
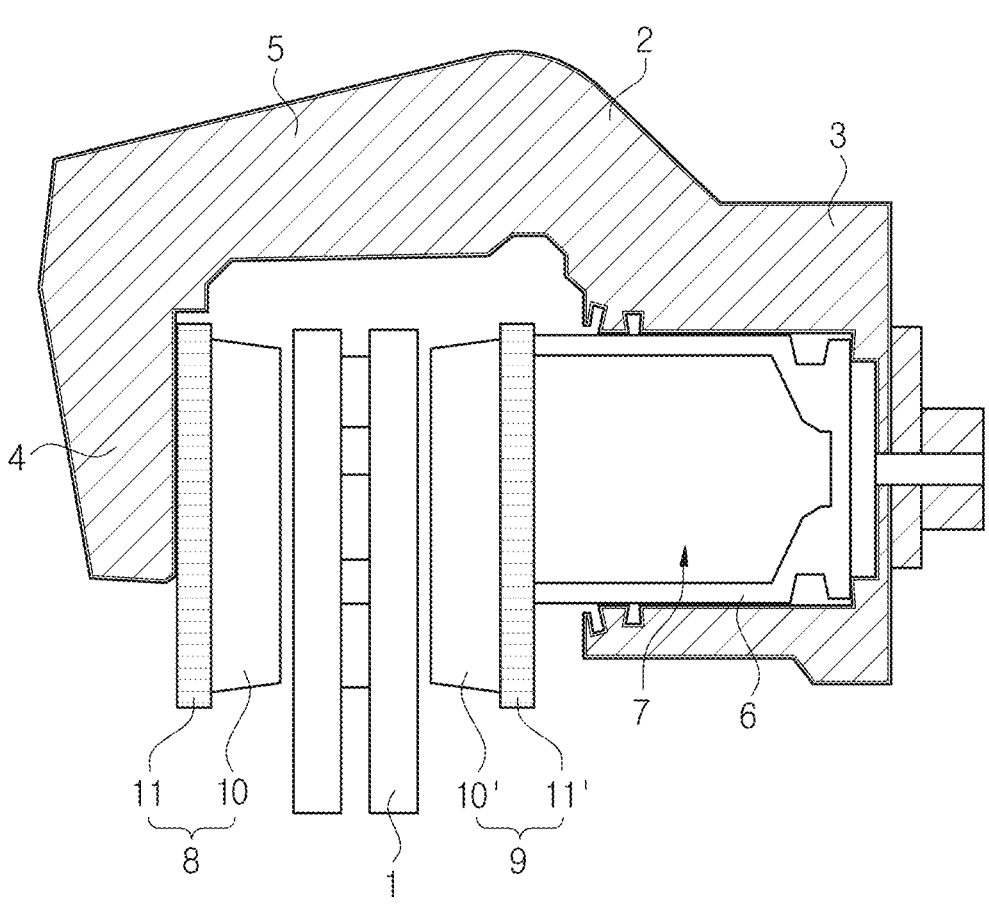
FIG. 1 shows a cross-sectional illustration of a brake disk brake system for a vehicle.

FIG. 1 shows a disk brake system for a vehicle. The disc brake system includes a brake disk 1. The disk brake system further comprises a caliper housing 2 having an inner part 3, an outer part 4, and a bridge part 5. The inner part 3, outer part 4, and bridge part 5 are integrally formed as a single onepiece part by selective laser sintering. The bridge part 5 connects the inner part 3 with the outer part 4. A brake piston 6 is received inside a cavity 7 formed within the inner part 3. The cavity 7 may be in fluid communication with a master cylinder of the disk brake system for hydraulic actuation of the brake. The outer part 4 of the caliper housing may be referred to as a caliper finger.

The disk brake system further comprises a pair of brake pads 8, 9. Upon application of the brake, the caliper finger 4 and the brake piston 6 push the brake pads 8, 9 in an axial direction toward one another and toward the brake disk 1. The brake pads 8, 9 each have a friction layer 10, 10', which is pushed against a friction surface of the brake disk 1 upon actuation of the disk brake system. The friction layers 10, 10' contain a material that shows a good stopping performance and heat transfer when engaging with the brake disk 1. The friction layers 10, 10' can have a thickness of at least 8 mm and/or at most 15 mm, for example. The material of the friction layers 10, 10' can for instance comprise at least one of copper, iron sulphide, graphite, zinc powder, basalt, calcium carbonate, tin sulphide, zinc aluminium, phenolic resin, rubber dust and mineral fibre. These materials show good stopping performance and heat transfer when engaging with the brake disk 1. The friction layers 10, 10' are each attached to a front side of a back plate 11, 11', which provides structural stability to the brake pads 8, 9. The brake piston 6 or the outer part 4 of the caliper housing 2 are configured to push against back sides of the back plates 11, 11' to push the friction layers 10, 10' against the brake disk 1.

Figure 2:
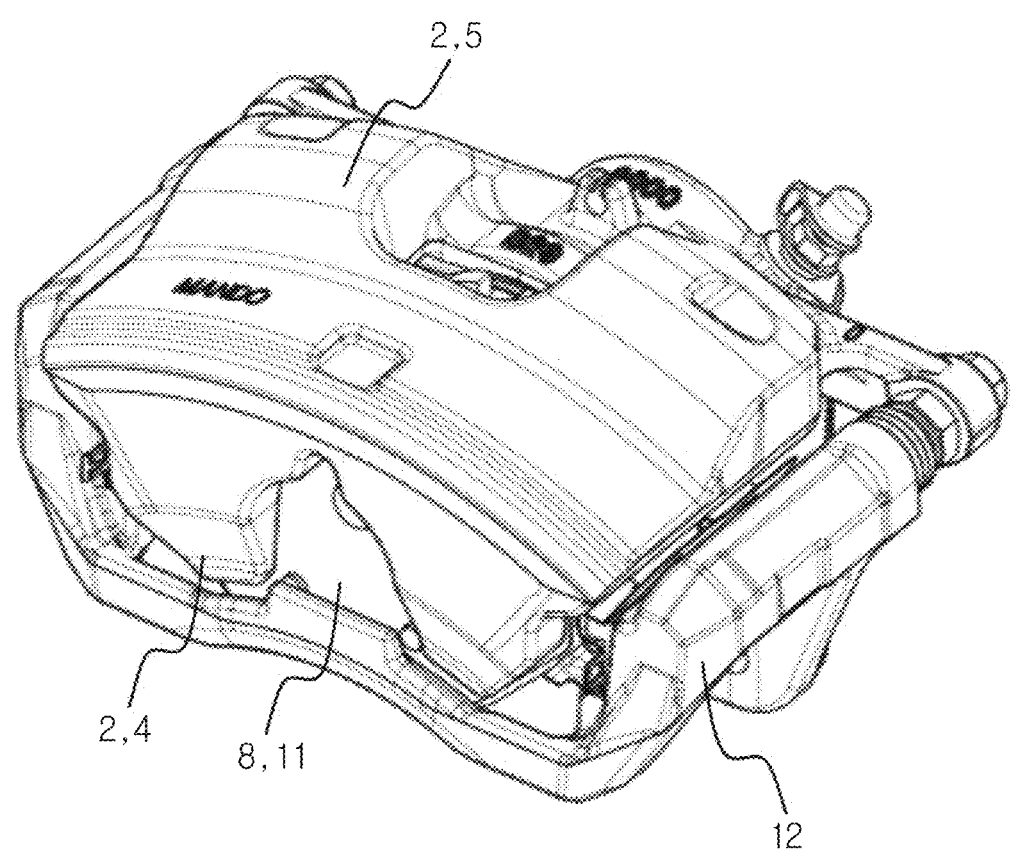
FIG. 2 shows a perspective view of the disk brake system.

FIG. 2 shows a perspective view of the disk brake system. Corresponding and reoccurring features shown in the different figures are denoted using the same reference numerals. The disk brake system comprises a caliper bracket, i.e., a carrier 12. The brake pads 8, 9 are received and held within the carrier 12 and are configured to slide with respect to the carrier 12, when the brake is applied. The outer part 4 of the caliper housing 2, i.e., the caliper finger, is shown to have a double finger design as known in the art. However, other shapes of the outer part 4 may be beneficial according to the present invention as discussed below.

Figure 3:
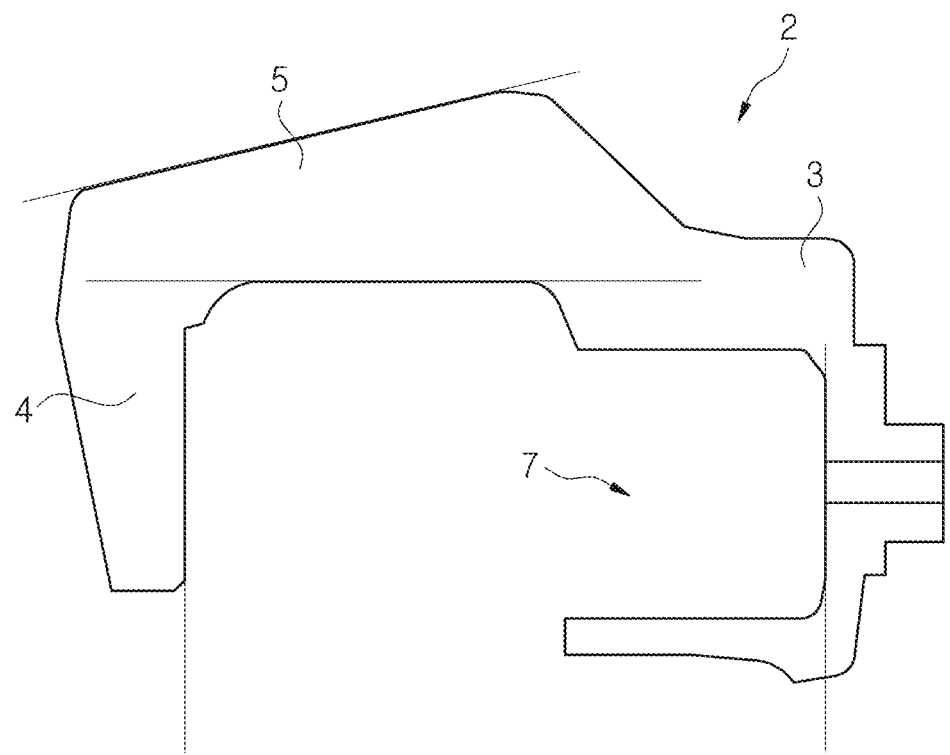
FIGS. 3 and 4 show schematic cross-sectional illustrations of a caliper housing.
Figure 4:
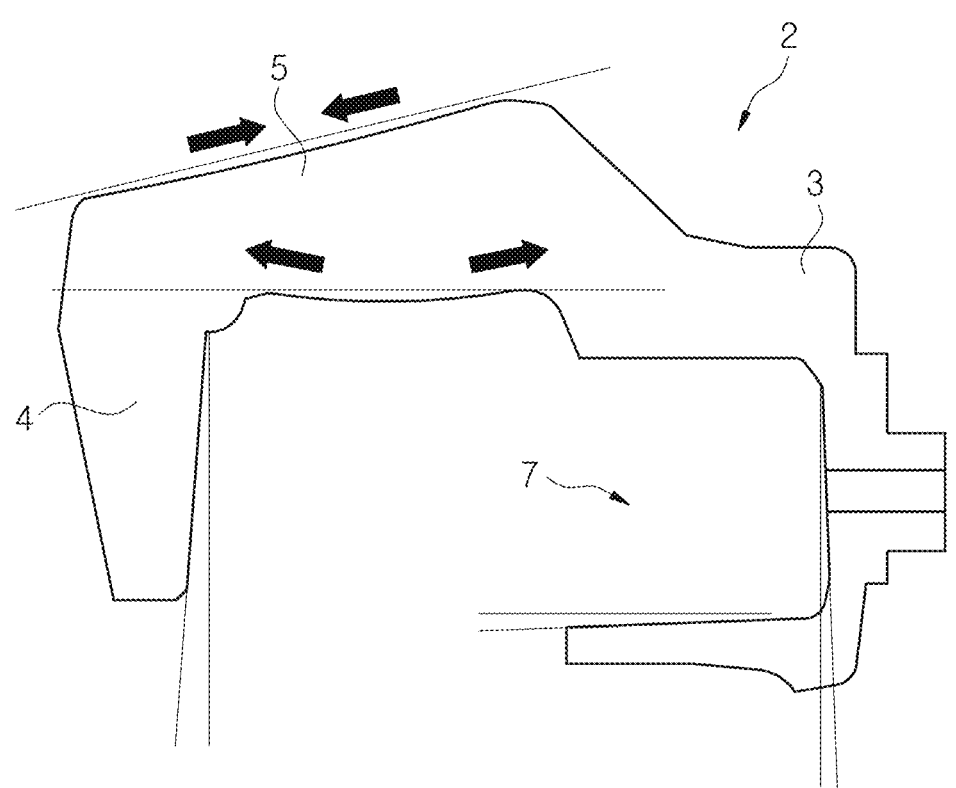

FIGS. 3 and 4 show cross-sectional illustrations of the caliper housing 2. While FIG. 3 illustrates the situation under no load and no pressure, where no axial deflection occurs, FIG. 4 illustrates that under pressure a deformation of the caliper housing 2 may occur resulting in an axial deflection. The arrows indicate compression and tension in the bridge part 5 of the caliper housing 2 that may occur under load. As can be seen, deformation of the inner part 3 and outer part 4 by a few degrees may occur. As the deformation is undesired, the proposed caliper housing seeks to reduce or avoid the deformation.

Figure 5:
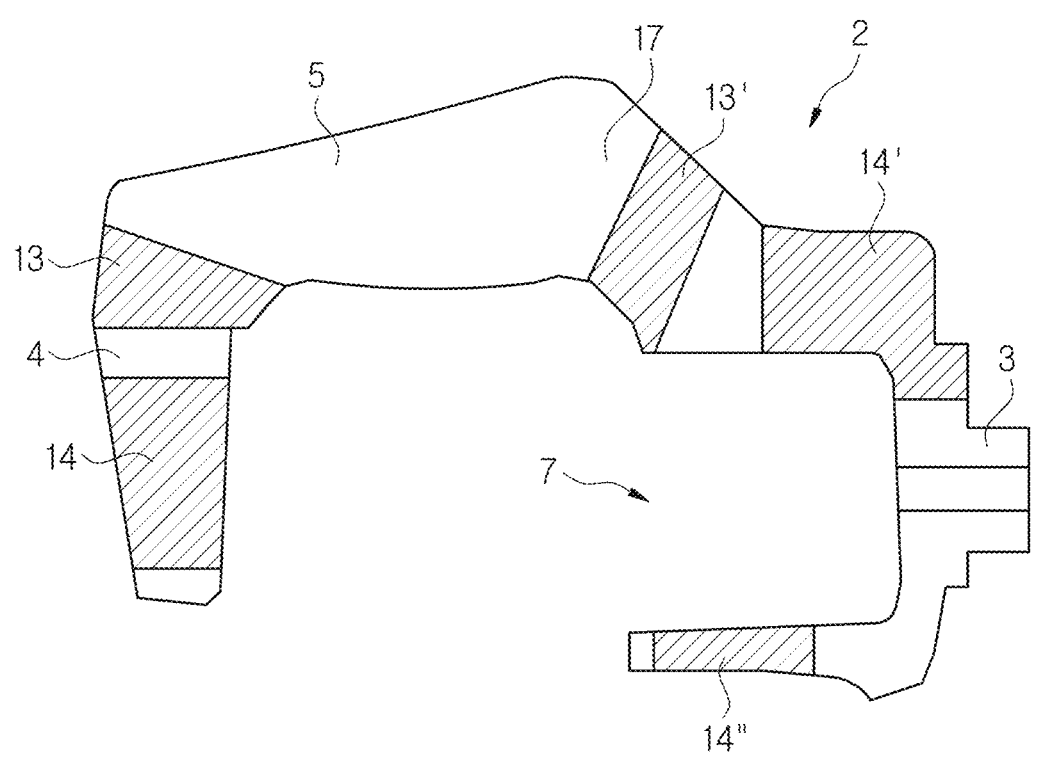
FIGS. 5 to 7 show schematic cross-sectional illustrations of a caliper housing according to one embodiment.
Figure 6:
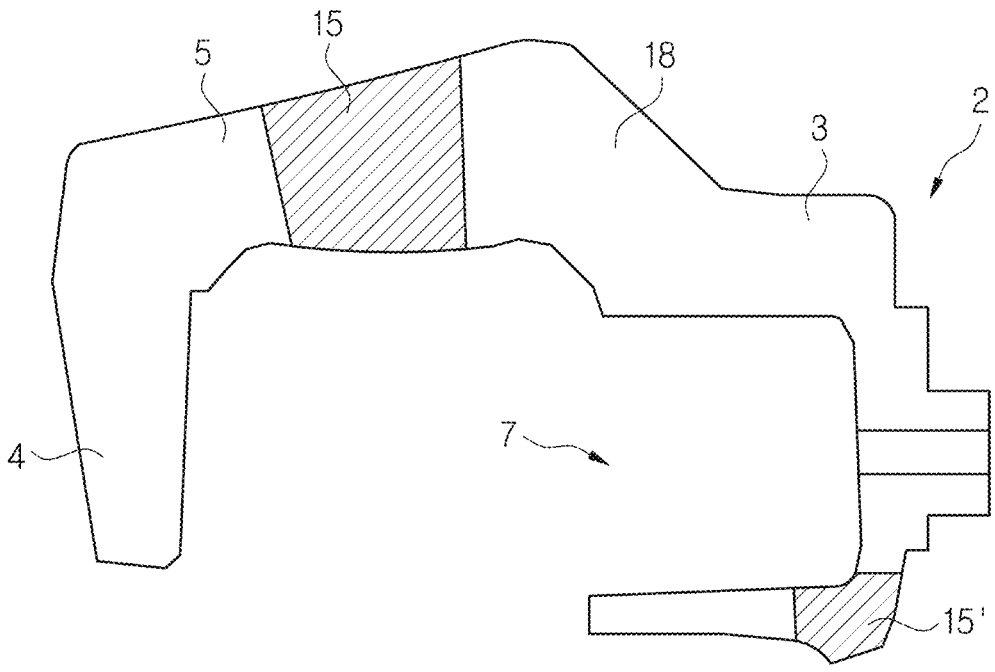
Figure 7:
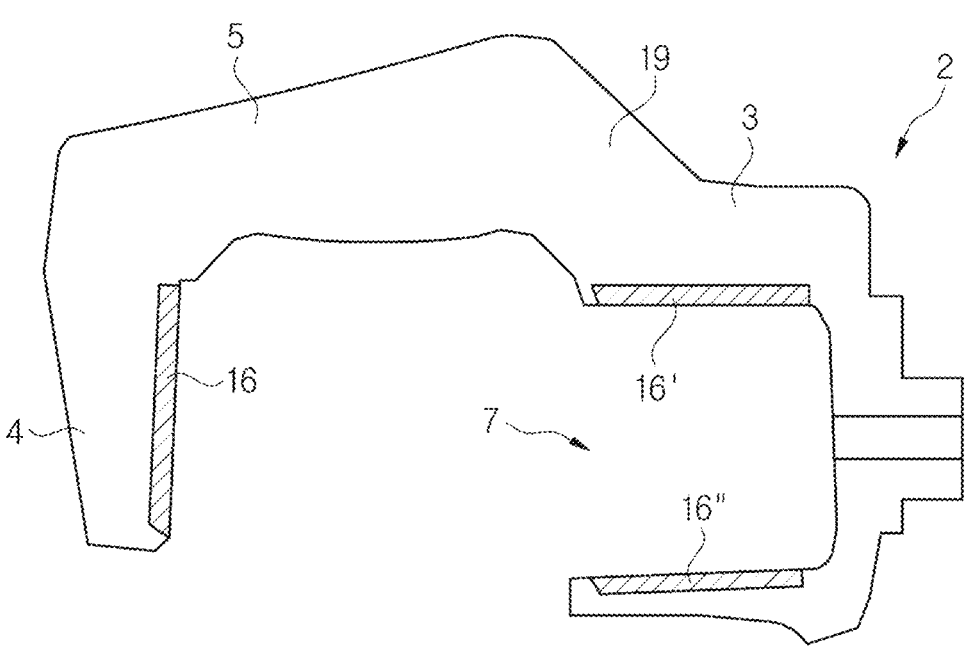

FIGS. 5 to 7 illustrate different aspects of the present invention. Any or all of these aspects may be provided in the same embodiment. The caliper housing 2 is manufactured by additive manufacturing such that it has different material properties in different regions. The regions having pairwise different material properties may be referred to as first regions 13, 14, 15, 16 and second regions 17, 18, 19. For example, a density of the material, e.g., a sintered metal, may be larger in the first regions 13, 14, 15 as compared with the second regions and/or another material composition, e.g., a different alloy, may be used in the first regions as comparted with the second regions.

As shown in FIG. 5 the caliper housing may have first regions 13, 13' that have a higher E modulus than other regions, i.e., than second regions 17. As illustrated, the first regions 13, 13' may be arranged in proximity to an interface between the bridge part 5 and the caliper finger 4 of the caliper housing 2 and in proximity to an interface between the bridge part 5 and the inner part 3 of the caliper housing 2. The caliper housing 2 may have a kink in these regions. In addition, a first region having a higher E modulus may be arranged in the bridge part 5 of the caliper housing 2. Further, first regions 14, 14', 14" of the caliper housing 2 may be formed that have a larger G modulus as compared with the second region 17. As illustrated, these first regions 14, 14', 14" may be formed in the caliper finger 4 and in the inner part 3 above and below the cavity 7. By selecting these positions for the first regions, the mechanical properties of the caliper housing are optimized, because deformation energy is dissipated and bending of the caliper housing 2 is avoided and ductile properties are improved in regions where a higher pressure occurs.

To further optimize the caliper housing 2, first regions 15, 15' may be formed that have a higher thermal conductivity and a higher specific heat as compared with a second region 18, as illustrated in FIG. 6. The first regions 15, 15' may be positioned in areas of the caliper housing 2 that have a large heat inflow, i.e., in a central portion of the bridge part 5 as well as in the inner part 3 in an edge portion below the cavity 7. Thereby, the thermodynamic properties of the caliper housing 2 may be improved to avoid overheating.

A further optimization of the caliper housing 2 is illustrated in FIG. 7. The caliper housing 2 may have first regions 16, 16', 16" that have a higher damping loss factor as compared with a second region 19 to avoid noise generation resulting from undesired vibrations, e.g., flutter vibrations. The first regions 16, 16', 16" may be arranged in portions, e.g., inner portions, of the caliper housing 2 that come into contact with other components such as the brake pad 8 or the brake piston 6. Therefore, the first regions 16, 16', 16" may form an inner surface of the caliper finger 4 and inner surfaces of the inner part 3 that delimit the cavity 7. Thereby, the dynamic damping and noise properties of the caliper housing may be improved.

Figure 8:
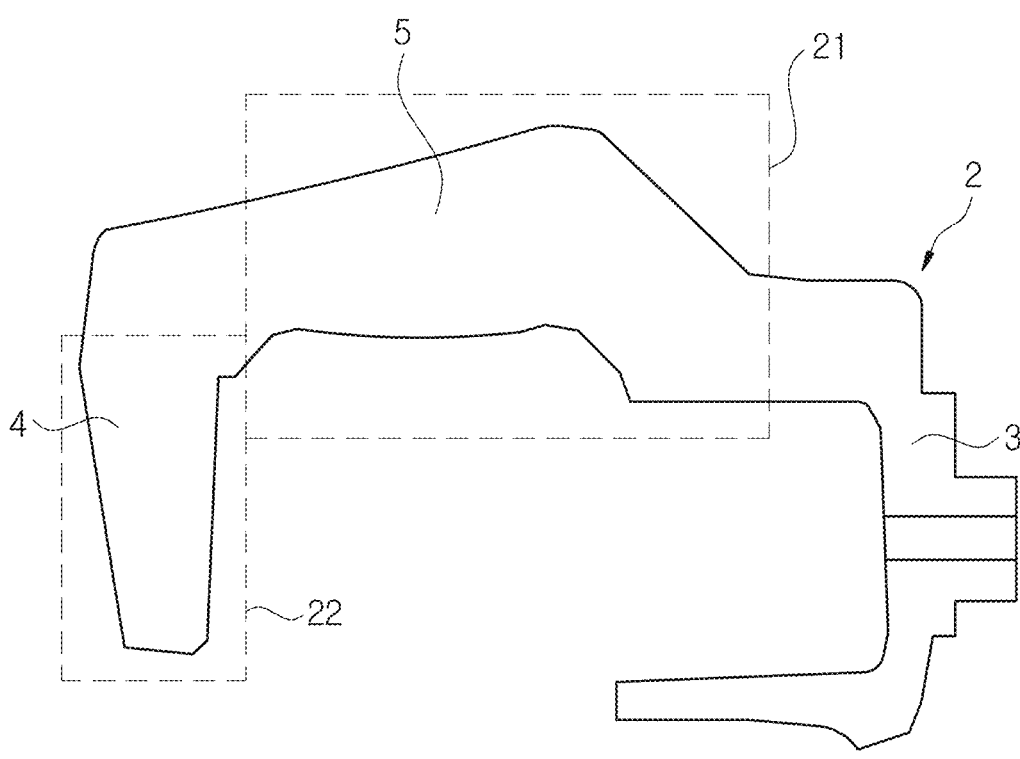
FIGS. 8 to 10 show further schematic cross-sectional illustrations of the caliper housing.
Figure 9:
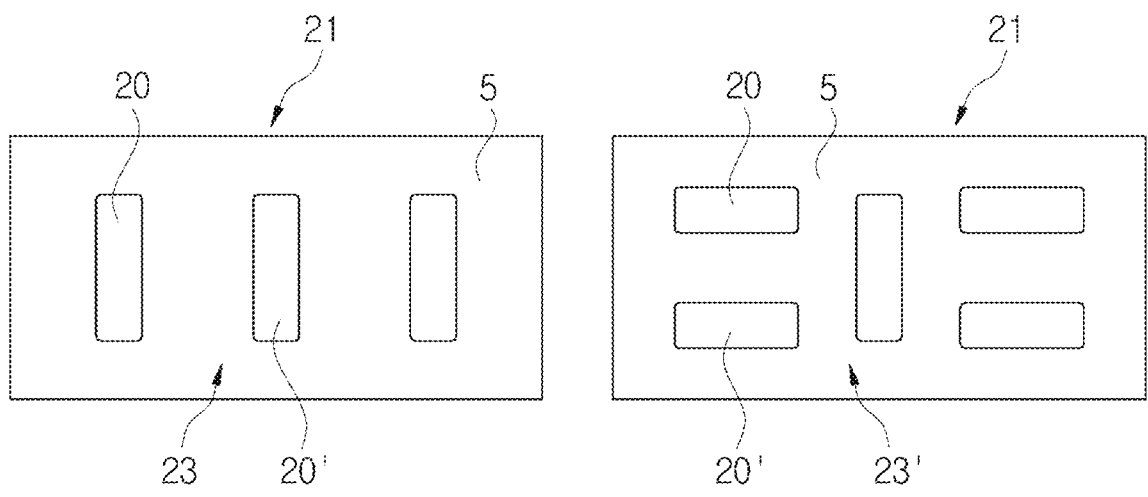
Figure 10:
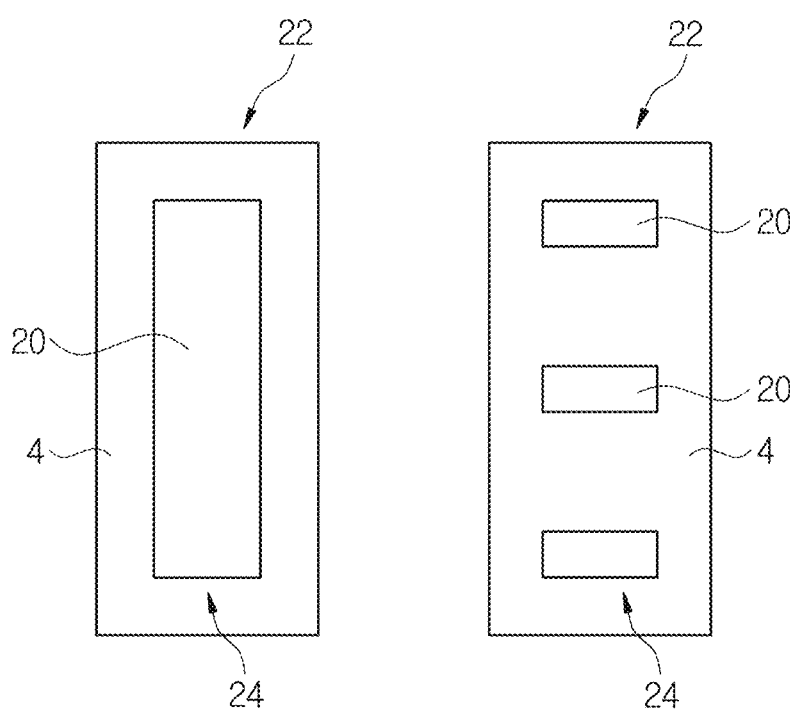
Figure 11:
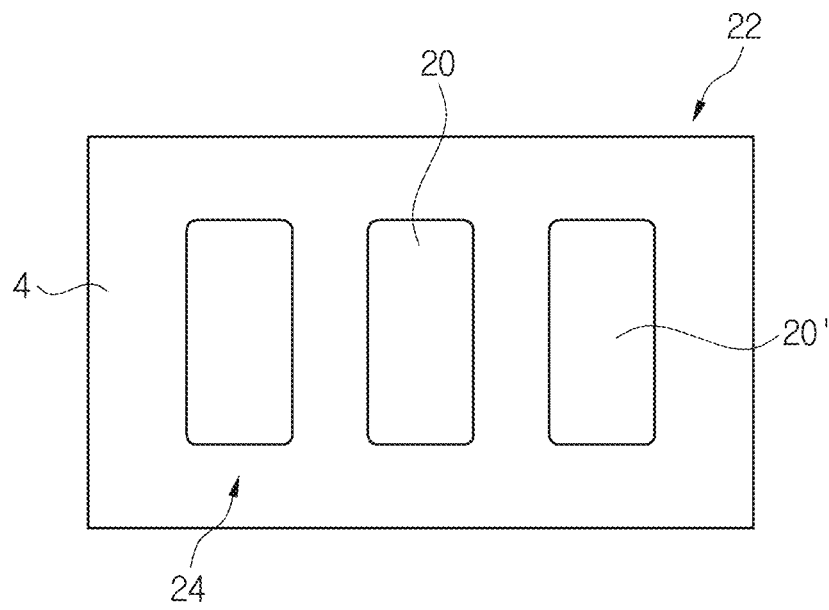
FIGS. 11 to 16 show outer parts of the caliper housing according to different embodiments.
Figure 12:
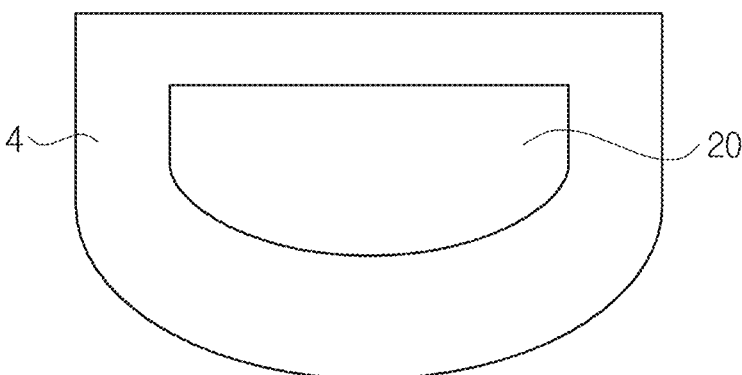
Figure 13:
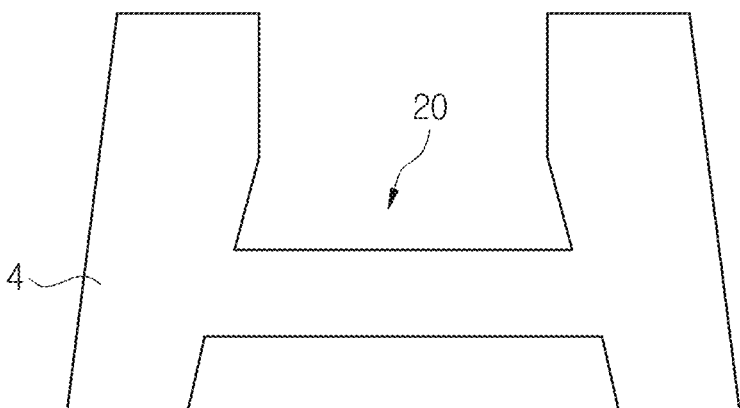
Figure 14:
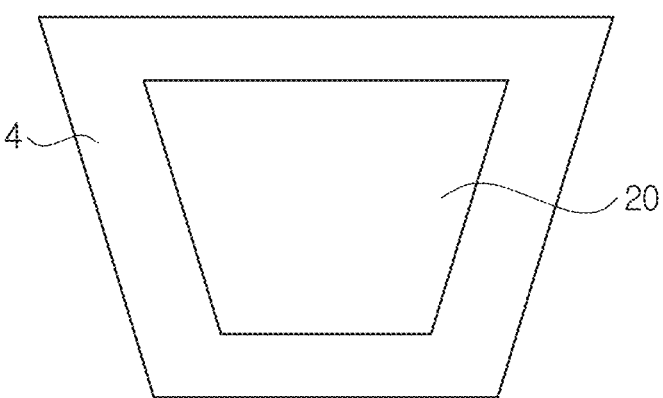
Figure 15:
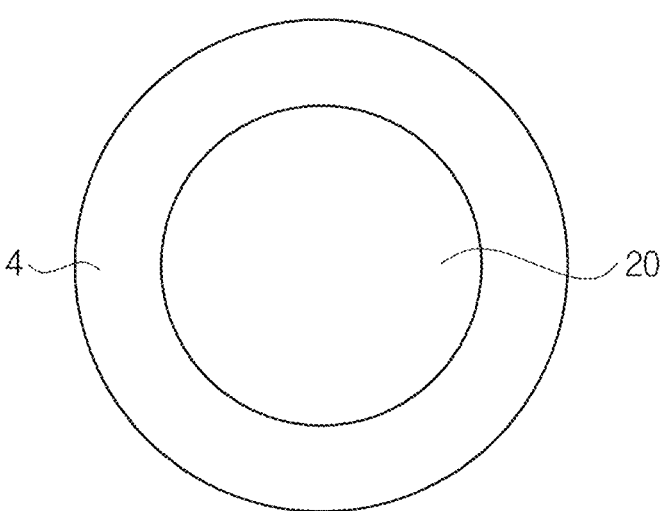
Figure 16:
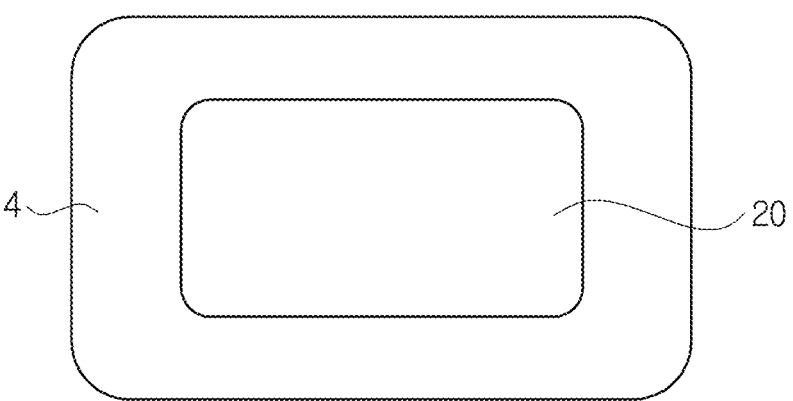

FIGS. 8 to 10 show further schematic views of the caliper housing 2. The caliper housing 2 may be formed by additive manufacturing such that one or more hole regions having at least one through hole (two of which are denoted using reference numerals 20 and 20'). The hole regions may be formed in a reBion 21 of the bridge part 5 and/or in a region 22 of the outer part 4. The hole regions may be beneficial with regard to anisotropic mechanical properties as well as heat removal capabilities of the caliper housing 2. As illustrated in FIG. 9, the hole regions 23, 23' may take various shapes within the region 21 of the bridge part 5 of the caliper housing 2.

FIG. 10 as well as FIGS. 11 to 16 illustrate different designs of the outer part 4 as viewed in the axial direction. As shown, the outer part 4 may contain a hole region 24 having at least one through hole 20, which enables a particularly robust design of the caliper finger typically not achievable in conventional cast caliper housings as known in the art. Also, the designs of the outer part 4 according to the illustrations enable a beneficial pressure region to be formed on an inner surface of the outer part 4. The pressure region of the outer part 4 defines the region of contact with the back side of the brake pad 8. The pressure region may form a closed loop that encircles the through hole 20, thereby enabling a pressure distribution resembling the pressure distribution that results from the piston pushing against the back side of the other brake pad 9. In this manner, the mechanical properties of the caliper housing 2 under load are further improved.

Features of the different embodiments which are merely disclosed in the exemplary embodiments may be combined with one another and may also be claimed individually.

What is claimed is:

1. A caliper housing for a disk brake system, comprising an inner part, an outer part, and a bridge part connecting the inner part and the outer part, characterized in that the caliper housing is formed by additive manufacturing such that a first region of the caliper housing and a second region of the caliper housing are formed and such that the first region has different material properties than the second region,
   wherein the caliper housing is formed by additive manufacturing such that a hole region of the caliper housing is formed,
   wherein the hole region comprises at least one through hole, wherein the hole region is formed in the outer part,
   wherein the outer part comprises an interior surface that is configured to push against a back side of a brake pad.

2. The caliper housing of claim 1, characterized in that the first region has a different density than the second region.

3. The caliper housing of claim 1, characterized in that the first region has a higher thermal conductivity or higher specific heat than the second region.

4. The caliper housing of claim 3, characterized in that the first region is a central portion of the bridge part or a portion of the inner part, wherein the inner part is configured to receive a brake piston.

5. The caliper housing of claim 1, characterized in that the first region has a higher E modulus than the second region.

6. The caliper housing of claim 5, characterized in that the first region is formed in the bridge part or in a region of an interface between the inner part and the bridge part or in a region of an interface between the outer part and the bridge part.

7. The caliper housing of claim 1, characterized in that the first region has a higher G modulus than the second region.

8. The caliper housing of claim 7, characterized in that the first region is formed in a portion of the outer part or in a portion of the inner part, wherein the inner part is configured to receive a brake piston.

9. The caliper housing of claim 1, characterized in that the inner part is configured to receive a brake piston.

10. The caliper housing of claim 1, characterized in that the first region has a higher vibration loss factor than the second region, wherein the first region forms an interior surface of the outer part or wherein the first region forms an interior surface of the inner part configured for facing a brake piston.

11. The caliper housing of claim 1, characterized in that the first region and the second region are formed by selective laser sintering.

12. A method for manufacturing a caliper housing according to claim 1, characterized by a step:

forming the caliper housing by additive manufacturing such that the first region of the caliper housing and the second region of the caliper housing are formed.

\* \* \* \* \*